(12) United States Patent
Peters et al.

(10) Patent No.: US 10,400,355 B2
(45) Date of Patent: *Sep. 3, 2019

(54) SHEAR SPUN SUB-MICROMETER FIBERS

(71) Applicant: SABIC GLOBAL TECHNOLOGIES B.V., Bergen op Zoom (NL)

(72) Inventors: Richard Peters, Pittsfield, MA (US); Jacob Scott Labelle, Pittsfield, MA (US); Erich Teutsch, Pittsfield, MA (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 297 days.

This patent is subject to a terminal disclaimer.

(21) Appl. No.: 14/912,292

(22) PCT Filed: Aug. 15, 2014

(86) PCT No.: PCT/US2014/051267
§ 371 (c)(1),
(2) Date: Feb. 16, 2016

(87) PCT Pub. No.: WO2015/023943
PCT Pub. Date: Feb. 19, 2015

(65) Prior Publication Data
US 2016/0208418 A1 Jul. 21, 2016

Related U.S. Application Data

(60) Provisional application No. 61/866,450, filed on Aug. 15, 2013, provisional application No. 61/866,469, (Continued)

(51) Int. Cl.
*B29B 9/10* (2006.01)
*D01D 5/40* (2006.01)
(Continued)

(52) U.S. Cl.
CPC ............... *D01D 5/40* (2013.01); *B29B 9/10* (2013.01); *D04H 1/40* (2013.01); *D04H 1/46* (2013.01)

(58) Field of Classification Search
None
See application file for complete search history.

(56) References Cited

U.S. PATENT DOCUMENTS 2,988,782 A 6/1961 Parrish et al.
3,219,601 A 11/1965 Koontz
(Continued)

FOREIGN PATENT DOCUMENTS

CN 102493009 A 6/2012
DE 19622476 A1 12/1997
(Continued)

OTHER PUBLICATIONS

International Search Report for International Application No. PCT/US2014/051267, International Application Filing Date: Aug. 15, 2014, dated Oct. 29, 2014, 15 pages, with English Translation of JP2007039840.

(Continued)

*Primary Examiner* — Jenna L Johnson
(74) *Attorney, Agent, or Firm* — Cantor Colburn LLP

(57) ABSTRACT

A process including shearing a first dispersion medium and a second dispersion medium under conditions that precipitate a plurality of polymeric fibers; and collecting the plurality of polymeric fibers at a rate of at least 300 grams/hour. The first dispersion medium is a solution including at least one polymeric component. The at least one polymeric component includes a polyetherimide component selected from the group consisting of polyetherimide homopolymers, polyetherimide co-polymers, polyetherether ketones homopolymers, polyetherether ketones copolymers, (Continued)

polyphenylene sulfones homopolymers, polyphenylene sulfones copolymers, and combinations thereof. Products produced by the process can be non-woven paper, medical implants, ultra-fine filters, membranes, hospital gowns, electrical insulation paper, honeycomb structures and personal hygiene products, dialyzers, blood, oxygenator filters, intravenous (IV) filters, diagnostic test filters, and blood/apheresis filters.

14 Claims, 13 Drawing Sheets

Related U.S. Application Data filed on Aug. 15, 2013, provisional application No. 61/866,479, filed on Aug. 15, 2013.

(51) Int. Cl.
  *D04H 1/40* (2012.01)
  *D04H 1/46* (2012.01)

(56) References Cited

U.S. PATENT DOCUMENTS

| | | | |
|---|---|---|---|
| 4,810,571 | A | 3/1989 | Guthrie |
| 5,814,349 | A | 9/1998 | Geus et al. |
| 6,495,078 | B1 | 12/2002 | Kurihara et al. |
| 6,656,583 | B1 | 12/2003 | Cziollek et al. |
| 7,323,540 | B2 | 1/2008 | Velev et al. |
| 8,551,378 | B2 | 10/2013 | Velev et al. |
| 2005/0032450 | A1 | 2/2005 | Haggard et al. |
| 2005/0067732 | A1* | 3/2005 | Kim .................. D01D 5/0038 264/172.19 |
| 2005/0163997 | A1 | 7/2005 | Van Trump et al. |
| 2006/0063882 | A1 | 3/2006 | Velev et al. |
| 2007/0089276 | A1 | 4/2007 | Dugan et al. |
| 2008/0242171 | A1 | 10/2008 | Huang et al. |
| 2009/0232920 | A1 | 9/2009 | Lozano et al. |
| 2010/0129628 | A1 | 5/2010 | Young |
| 2010/0247908 | A1 | 9/2010 | Velev et al. |
| 2012/0074612 | A1 | 3/2012 | Scrivens et al. |
| 2012/0077404 | A1 | 3/2012 | Scrivens et al. |
| 2012/0077406 | A1 | 3/2012 | Scrivens et al. |
| 2012/0149273 | A1 | 6/2012 | Moore et al. |
| 2012/0292796 | A1 | 11/2012 | Peno et al. |
| 2012/0309250 | A1 | 12/2012 | Velev et al. |
| 2013/0012598 | A1* | 1/2013 | Velev .................. D01D 5/40 514/772.4 |
| 2013/0078882 | A1 | 3/2013 | Yoo et al. |
| 2014/0167329 | A1 | 6/2014 | L'Abee et al. |
| 2015/0024163 | A1 | 1/2015 | Labelle et al. |
| 2015/0024185 | A1 | 1/2015 | Labelle et al. |
| 2015/0024186 | A1 | 1/2015 | Labelle et al. |
| 2017/0226663 | A1 | 8/2017 | Labelle et al. |

FOREIGN PATENT DOCUMENTS

| | | |
|---|---|---|
| EP | 0806500 A1 | 11/1997 |
| JP | 2007039840 A | 2/2007 |
| WO | 2012109215 A2 | 8/2012 |
| WO | 2014100213 A3 | 6/2014 |
| WO | 2014116941 A1 | 7/2014 |
| WO | 2014116946 A1 | 7/2014 |
| WO | 2014134668 A1 | 12/2014 |

OTHER PUBLICATIONS

Liao et al.; "Electrospinning Fabrication of partially crystalline bisphenol A polycarbonate nanofibers: Effects on conformation, crystallinity, and mechanical properties"; European Polymer Journal; vol. 47; 2011; pp. 911-924.

Alargova et al., "Formation of Polymer Microrods in Shear Flow by Emulsification—Solvent Attrition Mechanism," Langmuir 2006, vol. 22, pp. 765-774.

Bhat et al, "Extruded Continuous Filament Nonwovens: Advances in Scientific Aspects," Journal of Applied Polymer Science, vol. 83, p. 572-565 (2002).

Kinahan et al., "Tunable Silk: Using Microfluidics to Fabricate Silk Fibers with Controllable Properties," American Chemical Society, Biomacromolecules, 2011, 12, 1504-1511.

Mercader et al., "Kinetics of Fiber Solidification," PNAS Oct. 26, 2010, vol. 107, No. 43, pp. 18331-18335.

Polycarbonate Plastics and Bisphenol A Release Information, http://www.bisphenol-a.org/hurnari/polyplastics.html, retrieved Mar. 6, 2008, Wayback Machine.

S.A. White et al., "Resistance of a Polyetherimide to Environmental Stress Crazing and Cracking," J. Applied Polymer Sci., 27, 2675-2682 (1982).

Sutti et al., "Shear-Enhanced Solution Precipitation: A Simple Process to Produce Short Polymeric Nanofibers," Journal of Nanoscience arid Nanotechnology, vol. 11, pp. 8947-8952, 2011.

\* cited by examiner

SHEAR SPUN SUB-MICROMETER FIBERS

CROSS REFERENCE TO RELATED APPLICATIONS

This application is a National Stage application of PCT/US14/051267, filed Aug. 15, 2014, which claims the benefit of U.S. Provisional Application No. 61/866450, filed Aug. 15, 2013, U.S. Provisional Application No. 61/866469, filed Aug. 15, 2013, and U.S. Provisional Application No. 61/866479, filed Aug. 15, 2013, all of which are incorporated by reference in their entirety herein.

BACKGROUND OF THE INVENTION

The invention relates generally to shear spun sub-micrometer fibers and more specifically to shear spun sub-micrometer polymeric fibers.

Polyetherimide (PEI) fibers are used in many applications and composite structures that require various unique properties of the different resins to perform in the necessary environment. Many of these applications require the resins to be in a fiber size much smaller than currently achievable using conventional methods of fiber production at a reasonable throughput rate. This has been a barrier to the introduction and testing of many of these resins suitability for use in these applications. PEI has been converted into fibers using the melt spinning process for some time. Such processes are capable of producing fibers in the range of 10-20 micrometers. Melt blowing has also been attempted with PEI, and there is currently work being done to make this process amenable to using PEI. If the technical hurdles could be overcome, it could be possible to produce PEI fibers in the 3 to 10 micrometer range.

Polyphenylene ether (PPE) resin and/or polybutylene terephthalate (PBT) resin fibers are used in many applications and composite structures that require various unique properties of the different resins to perform in the necessary environment. Many of these applications require the resins to be in a fiber size much smaller than currently achievable using conventional methods of fiber production at a reasonable throughput rate. This has been a barrier to the introduction and testing of many of these resins suitability for use in these applications. PPE and PBT resins have been converted down to 15 to 20 micrometers in diameter using the melt spinning process, but haven't been used in melt blowing processes.

Polycarbonate (PC) and PC copolymer fibers are used in many applications and composite structures that require various unique properties of the different resins to perform in the necessary environment. Many of these applications require the resins to be in a fiber size much smaller than currently achievable using conventional methods of fiber production at a reasonable throughput rate. This has been a barrier to the introduction and testing of many of these resins suitability for use in these applications. PC and PC Copolymers have been converted into fibers using the melt spinning process for some time. This is capable of producing fibers in the range of 10-20 micrometers. Melt blowing has also been used for some PC's producing fibers in the 1 to 10 micrometer range.

Electro-spinning of all of these resins is possible, but the cost of the resin and the slow throughput rate of this process have made this method unacceptable. Typical production rates for this process are in the 200 to 300 grams per hour, and 60 meters per minute line speed rates.

For the foregoing reasons, there is a need for PEI resins, Polyphenylene ether (PPE), such as NORYL™ resins or PPO™ resins, Polybutylene terephthalate (PBT) VALOX™ resins, and Polycarbonate (PC), and PC Copolymer LEXAN™ resins in nano-fiber form produced from a shear spinning process in applications, such as electrical paper, battery separator membranes, structural composites and filter papers.

BRIEF SUMMARY OF THE INVENTION

Various embodiments relate to a process including shearing a first dispersion medium and a second dispersion medium under conditions that precipitate a plurality of polymeric fibers; and collecting the plurality of polymeric fibers at a rate of at least 300 grams/hour. The first dispersion medium can be a solution comprising at least one polymeric component. The at least one polymeric component can include a polyetherimide component selected from the group consisting of polyetherimide homopolymers, polyetherimide co-polymers, polyetherether ketones homopolymers, polyetherether ketones copolymers, polyphenylene sulfones homopolymers, polyphenylene sulfones copolymers, and combinations thereof. The at least one polymeric component can include a poly(phenylene ether) component, a poly(phenylene ether)-polysiloxane block copolymer, or combinations thereof.

Various embodiments relate to a process for forming staple fibers from a polyetherimide component selected from (i) polyetherimide homopolymers, (ii) polyetherimide co-polymers, and (iii) combinations thereof. The process can include: depositing a solution of the polyetherimide component in a solvent in a dispersion medium and shearing the dispersion medium such that the solution is formed into a polyetherimide fiber having a length to diameter ratio that can be more than 1,000,000:1, 10,000:1, 500:1, 100:1 or 10:1, and a diameter ranging from 50 nanometers to 5 micrometers, preferably 0.05 to 2 micrometers, which is insoluble in the dispersion medium; and collecting a plurality of polyetherimide fibers so formed. The process can further include the step of forming the collected fibers into a non-woven web. Other embodiments include forming and collecting fibers of polycarbonates and polyphenylene ethers, among others, and making non-woven webs for use in various products.

Various embodiments relate to a process for forming staple fibers from a polymeric component selected from the group consisting of a polycarbonate component, a polycarbonate copolymer component, and combinations thereof. The process can include depositing a solution of the polymeric component in a solvent in a dispersion medium and shearing the dispersion medium such that the solution is formed into a polyetherimide, polycarbonate, polyphenylene ether or other fiber according to the invention having a length to diameter ratio that is more than 10 to more than 1,000,000, and a diameter ranging from 50 nanometers to 5 micrometers, preferably 0.05 to 2 micrometers which is insoluble in the dispersion medium; and collecting a plurality of fibers so formed. The process can further include the step of forming the collected fibers into a non-woven web.

Various embodiments relate to a product produced by the process. The product can be non-woven paper, medical implants, ultra-fine filters, membranes, hospital gowns, electrical insulation paper, honeycomb structures and personal hygiene products, dialyzers, blood, oxygenator filters, intravenous (IV) filters, diagnostic test filters, and blood/apheresis filters. The product can be a composite non-woven product comprising the spun filaments and at least one other fiber. The product can be a composite non-woven product adhered to a rolled sheet good. The product can be a composite non-woven product adhered to at least one of a sheet or film.

BRIEF DESCRIPTION OF THE DRAWINGS

These and other features, aspects, and advantages of the present invention will become better understood with reference to the following description and appended claims, and accompanying drawings where:

Figure 1:
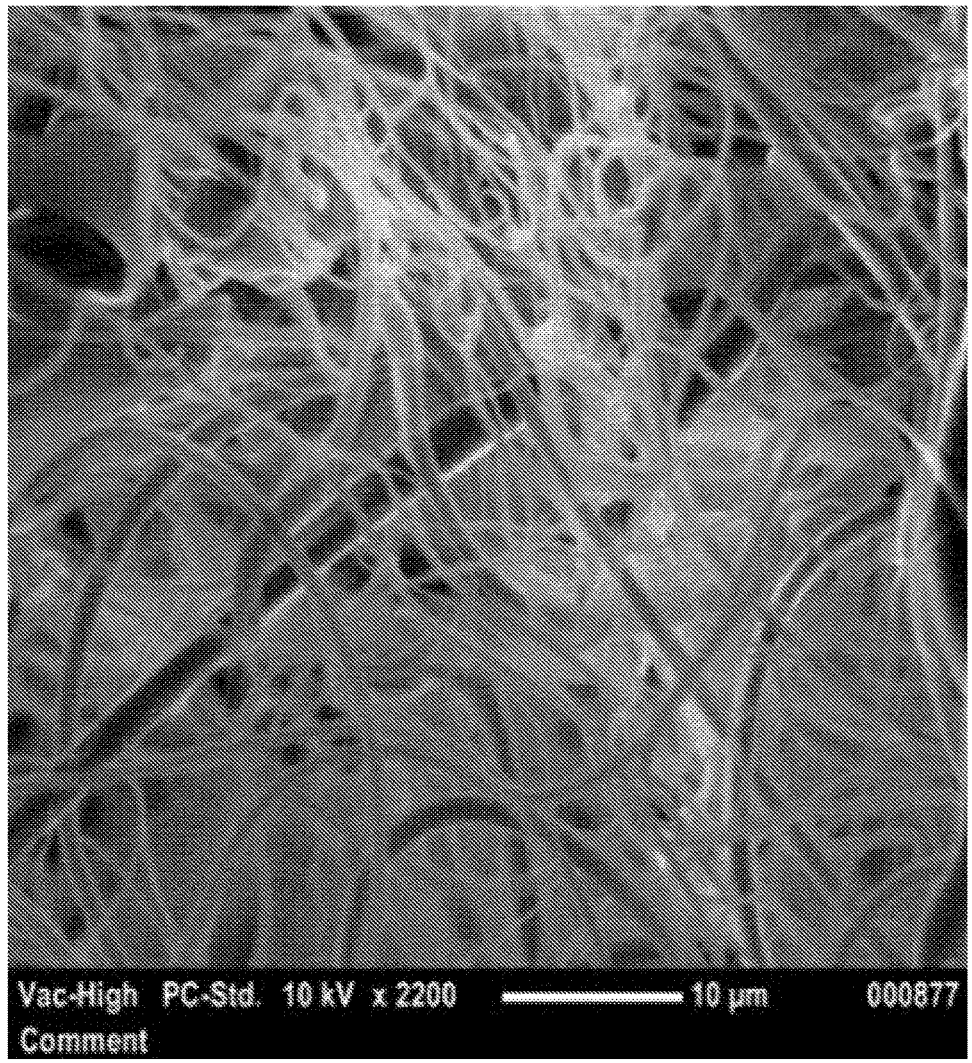
FIG. 1: shows a PEI resin, ULTEM™, solution spun to average fiber diameters in the sub-micrometer range.

It should be understood that the various embodiments are not limited to the arrangements and instrumentality shown in the drawings.

DETAILED DESCRIPTION OF THE INVENTION

Using the shear spinning process, according to various embodiments, PEI resins can be solution spun into fiber diameters in the sub-micrometer range.

The present invention may be understood more readily by reference to the following detailed description of preferred embodiments of the invention as well as to the examples included therein. All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

Various embodiments relate to polyetherimide (PEI), such as ULTEM™ resins, in nano-fiber form produced from a shear spinning process in applications, such as electrical paper, battery separator membranes, structural composites, and filter papers. Other embodiments relate to polyphenylene ether (PPE), such as NORYL™ resins or PPO™ resins, and polybutylene terephthalate (PBT) VALOX™ resins, in nano-fiber form produced from a shear spinning process in applications, such as electrical paper, battery separator membranes, structural composites and filter papers. Various embodiments relate to Polycarbonate (PC) and PC Copolymer LEXAN™ resins, in nano-fiber form produced from a shear spinning process in applications, such as electrical paper, battery separator membranes, structural composites, and filter papers.

Using the shear spinning process, these materials can be solution spun into fiber diameters in the sub-micrometer range. Even small decreases in fiber diameters results in substantial increases in the surface area of the resins, thereby increasing the performance benefit that the individual resins bring to the applications. Each of these resin families have been converted to sub-micrometer fibers using this process. The advantage this process brings is a reasonable throughput of ultra-fine fibers enabling them to be produced in an economically viable method. Very high throughput rates and lines speeds that are orders of magnitude greater than electro-spinning, and compatible with the wet laid paper making processes.

The output of this process is bulk staple fiber with controlled lengths. This fiber can then be used in downstream wet laid or dry laid non-woven processes, or sprayed as a coating onto another substrate or rolled good product. These processes are used to produce applications such as membranes, battery separators, filtration media, composites, electrical papers, and honeycomb papers.

Various embodiments relate to a process comprising shearing a first dispersion medium and a second dispersion medium under conditions that precipitate a plurality of polymeric fibers; and collecting the plurality of polymeric fibers at a rate of at least 300 grams/hour. The first dispersion medium can be a solution comprising at least one polymeric component. The at least one polymeric component can include a polyetherimide component selected from the group consisting of polyetherimide homopolymers and polyetherimide co-polymers, polyetherether ketones homopolymers, polyetherether ketones copolymers, polyphenylene sulfones homopolymers, polyphenylene sulfones copolymers, and combinations thereof. The at least one polymeric component can include one selected from the group consisting of a poly(phenylene ether) component, a poly(phenylene ether)-polysiloxane block copolymer, and combinations thereof. The at least one polymeric component can include a polycarbonate component, a polycarbonate copolymer component, or combinations thereof.

The process can operate at a spinning rate within a range having a lower limit and/or an upper limit. The range can include or exclude the lower limit and/or the upper limit. The lower limit and/or upper limit can be selected from 300, 500, 1000, 1500, 2000, 2500, 3000, 3500, 4000, 4500, 5000, 5500, 6000, 6500, 7000, 7500, 8000, 8500, 9000, 9500, 10000, 11000, 12000, 13000, 14000, 15000, 16000, 17000, 18000, 19000, 20000, 21000, 22000, 23000, 24000, 25000, 26000, 28000, and 30000 grams/hour. For example, according to certain preferred embodiments, the process can operate at a spinning rate of at least 7000 grams/hour.

Each of the plurality of polymeric fibers can have a length to diameter ratio within a range having a lower limit and/or an upper limit. The range can include or exclude the lower limit and/or the upper limit. The lower limit and/or upper limit can be selected from 10, 100, 1000, 5000, 10000, 20000, 30000, 40000, 50000, 60000, 70000, 80000, 90000, 100000, 120000, 140000, 160000, 180000, 200000, 250000, 300000, 350000, 400000, 450000, 500000, 600000, 700000, 800000, 900000, 950000, and 1000000. For example, according to certain preferred embodiments, each of the plurality of polymeric fibers can have a length to diameter ratio of more than 10 to less than 1,000,000.

Each of the plurality of polymeric fibers can have a diameter within a range having a lower limit and/or an upper limit. The range can include or exclude the lower limit and/or the upper limit. The lower limit and/or upper limit can be selected from 0, 0.1, 0.2, 0.3, 0.4, 0.5, 0.6, 0.7, 0.8, 0.9, 1, 1.1, 1.2, 1.3, 1.4, 1.5, 1.8, 2, 2.2, 2.4, 2.62.8, 3, 3.3, 3.6, 3.7, 4, 4.3, 4.6, 4.7, 4.8, 4.9, 5, 5.5, 5.6, 5.7, 5.8, 5.9, and 6 micrometers. For example, according to certain preferred embodiments, each of the plurality of polymeric fibers can have a diameter ranging from more than 0 to 5 micrometers.

The first dispersion medium can be insoluble in the second dispersion medium. The first dispersion medium can be injected into the second dispersion medium. The first dispersion medium can further include one selected from meta-cresol, veratrol, ortho-dichlorobenzene (ODCB), N-methyl pyrrolidone (NMP), chloroform, tetrahydrofuran (THF), dimethylformamide (DMF), dichloromethane (DCM) dimethylacetamide (DMAc), dimethyl carbonate (DMC), diethyl carbonate (DEC), ethyl methyl carbonate (EMC), ethylene carbonate (EC), dimethyl sulfoxide (DMSO), hexafluoro-2-propanol (HFIP), trichloroethane (TCHE), tetrachloroethane, trifluoroacetic acid (TFA), 4-chloro-3-methyl-phenol, 4-chloro-2-methyl-phenol, 2,4-dichloro-6-methyl-phenol, 2,4-dichloro-phenol, 2,6-dichloro-phenol, 4-chloro-phenol, 2-chloro-phenol, ortho-cresol, meta-cresol, para-cresol, 4-methoxy-phenol, catechol, benzoquinone, 2,3-xylenol, 2,6-xylenol, resorcinol, and combinations thereof.

The plurality of polymeric fibers can be insoluble in the second dispersion medium. The second dispersion medium can include a liquid component. The liquid component can include a member selected from water, ethyl alcohol, propyl glycol, propylene glycol, and combinations thereof. The second dispersion medium can further include a member selected from water, ethyl alcohol, propyl glycol, propylene glycol, glycerol, meta-cresol, veratrol, ortho-dichlorobenzene (ODCB), N-methyl pyrrolidone, chloroform, tetrahydrofuran (THF), dimethylformamide (DMF) and dimethylacetamide (DCM), and combinations thereof.

The process can further include producing a non-woven web comprising the plurality of polymeric fibers. The non-woven web can have a width within a range having a lower limit and/or an upper limit. The range can include or exclude the lower limit and/or the upper limit. The lower limit and/or upper limit can be selected from 125, 130, 135, 140, 145, 150, 175, 200, 225, 250, 300, 350, 400, 500, 600, 700, 800, 900, 950, and 1000 mm. For example, according to certain preferred embodiments, the non-woven web can have a width of at least 150 mm.

The process can be carried out at a temperature within a range having a lower limit and/or an upper limit. The range can include or exclude the lower limit and/or the upper limit. The lower limit and/or upper limit can be selected from −30, −25, −20, −15, −10, −5, 0, 5, 10, 15, 20, 25, 30, 40, 50, 60, 70, 80, 90, 100, 115, 130, 150, 170, 200, 210, and 220 degrees Celsius. For example, according to certain preferred embodiments, the process can be carried out at a temperature of from −30 to 210 degrees Celsius.

The first dispersion medium can have a viscosity within a range having a lower limit and/or an upper limit. The range can include or exclude the lower limit and/or the upper limit. The lower limit and/or upper limit can be selected from 10, 100, 200, 300, 400, 500, 600, 700, 800, 900, 1000, 1200, 1400, 1600, 1800, 2000, 2500, 3000, 3500, 4000, 4500, 5000, 6000, 7000, 8000, 9000, 10000, 12000, 14000, 16000, 18000, 20000, 22000, 23500, 24000, 24500, and 25000 cP. For example, according to certain preferred embodiments, the first dispersion medium can have a viscosity of from 10 to 20,000 cP.

The second dispersion medium can have a viscosity within a range having a lower limit and/or an upper limit. The range can include or exclude the lower limit and/or the upper limit. The lower limit and/or upper limit can be selected from 10, 100, 200, 300, 400, 500, 600, 700, 800, 900, 1000, 1200, 1400, 1600, 1800, 2000, 2500, 3000, 3500, 4000, 4500, 5000, 6000, 7000, 8000, 9000, 10000, 12000, 14000, 16000, 18000, 20000, 22000, 23500, 24000, 24500, and 25000 10, 100, 200, 300, 400, 500, 600, 700, 800, 900, 1000, 1200, 1400, 1600, 1800, 2000, 2500, 3000, 3500, 4000, 4500, 5000, 6000, 7000, 8000, 9000, 10000, 12000, 14000, 16000, 18000, 20000, 22000, 23500, 24000, 24500, and 25000 cP. For example, according to certain preferred embodiments, the second dispersion medium can have a viscosity of from 10 to 20,000 cP.

The process can further include producing a non-woven web comprising the plurality of polymeric fibers. According to various embodiments, producing the non-woven web can include depositing the plurality of polymeric fibers onto a carrier substrate, a functional sheet, a film, a non-woven, a rolled good product, and combinations thereof. The carrier substrate can be a reciprocating belt. The process can further include solidifying the plurality of polymeric fibers before the depositing step. The non-woven web can be unconsolidated. The process can further include consolidating the non-woven web. The process can further include consolidating the non-woven web under pressure.

The non-woven web can have a width within a range having a lower limit and/or an upper limit. The range can include or exclude the lower limit and/or the upper limit. The lower limit and/or upper limit can be selected from 125, 130, 135, 140, 145, 150, 160, 170, 180, 190, 200, 220, 240, 260, 280, 300, 325, 350, 375, 400, 450, 500, 550, 600, 650, 700, 750, 800, 850, 900, 925, 950, 975, and 1000 mm. For example, according to certain preferred embodiments, the non-woven web can have a width of at least 150 mm.

According to various embodiments, each of the plurality of polymeric fibers can be provided with at least one additional functionality imparting therapeutic activity, catalytic activity microelectronic activity, micro-optoelectronic activity, magnetic activity, biological activity, and combinations thereof.

According to various embodiments, none of the plurality of polymeric fibers are bonded to adjacent fibers. According to various embodiments, some of the plurality of polymeric fibers are at least partially bonded to adjacent fibers. According to various embodiments, each of the plurality of polymeric fibers is at least partially bonded to adjacent fibers. The process can further include entangling the fibers. The entangling can be one of needle-punching and fluid hydroentanglement.

The polyetherimide component can include a polyetherimide in molten form.

The polyetherimide component can be analine endcapped (or endcapped with analine). The polyetherimide component can be a reaction product, of 4,4'-Bisphenol A dianhydride and metaphenylene diamine monomers, wherein the reaction product is endcapped with analine (or analine-endcapped). The polyetherimide component can be a reaction product, of 4,4'-bisphenol A dianhydride and paraphenylene diamine monomers, wherein the reaction product is endcapped with analine (or analine-endcapped). The polyetherimide component can be the reaction product, of 4,4'-bisphenol A dianhydride, aminopropyl capped poly dimethyl siloxane, and metaphenylene diamine monomers, wherein the reaction product is analine endcapped.

The polyetherimide component can be a thermoplastic resin composition including: the polyetherimide, and a phosphorous-containing stabilizer, in an amount that is effective to increase the melt stability of the polyetherimide, wherein the phosphorous-containing stabilizer exhibits a low volatility such that, as measured by thermogravimetric analysis of an initial amount of a sample of the phosphorous-containing stabilizer, greater than or equal to 10 percent by weight of the initial amount of the sample remains unevaporated upon heating of the sample from room temperature to 300° C. at a heating rate of 20° C. per minute under an inert atmosphere.

The polyetherimide component can be in the form of a solution of polyetherimide in a solvent. The process can further include at least partially removing the solvent from the fibers before the fibers are deposited. The solvent can be selected from meta-cresol, veratrol, ortho-dichlorobenzene (ODCB), N-methyl pyrrolidone, and mixtures thereof. The solvent can be selected from chloroform, tetrahydrofuran (THF), dimethylformamide (DMF) and dimethylacetamide (DCM).

The poly(phenylene ether) component can include repeating structural units having the formula:

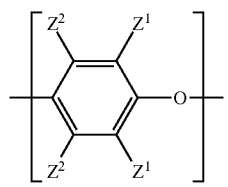

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and wherein each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms The poly(phenylene ether)-polysiloxane block copolymer can be prepared by an oxidative copolymerization method. The poly(phenylene ether) component can include a homopolymer or copolymer of monomers selected from the group consisting of 2,6 dimethylphenol, 2,3,6 trimethylphenol, and combinations thereof. The polymeric component can be in the form of a solution comprising the poly (phenylene ether) component in a solvent.

The polycarbonate component can include a polycarbonate copolymer including bisphenol A carbonate units and units of the formula:

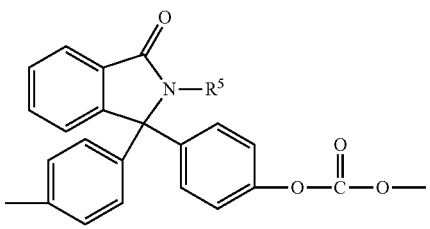

wherein $R^5$ is hydrogen, phenyl optionally substituted with up to five $C_{1-10}$ alkyl groups, or $C_{1-4}$ alkyl. The polycarbonate component can include a poly(carbonate-siloxane) including bisphenol A carbonate units, and siloxane units of the formula:

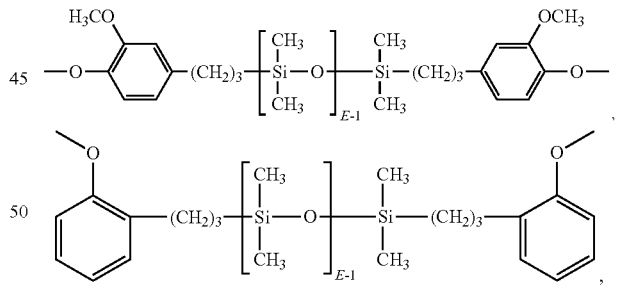

or a combination including at least one of the foregoing, wherein E has an average value of 2 to 200, wherein the poly(carbonate-siloxane) comprises 0.5 to 55 wt. % of siloxane units based on the total weight of the poly(carbonate-siloxane). The polycarbonate component can be a bisphenol polycarbonate. The polycarbonate component can be in the form of a solution of the polycarbonate component in a solvent.

The process according to various embodiments can further include at least partially removing the solvent from the fibers before the fibers are deposited. The solvent can be selected from the group of solvents consisting of veratrol, ortho-dichlorobenzene (ODCB), and mixtures thereof. The solvent can be at least one selected from the group of solvents consisting of chloroform, tetrahydrofuran (THF), dimethylformamide (DMF) and dimethylacetamide (DCM).

The non-woven web can include an amount of a material selected from polyvinyl pyrrolidine, polymethyl methacrylate, polyvinylidene fluoride, polypropylene, polyethylene oxide, agarose, polyvinylidene fluoride, polylactic glycolic acid, nylon 6, polycaprolactone, polylactic acid, polybutylene terephthalate, and combinations thereof. The amount of the material can be within a range having a lower limit and/or an upper limit. The range can include or exclude the lower limit and/or the upper limit. The lower limit and/or upper limit can be selected from 0, 0.1, 0.2, 0.3, 0.4, 0.5, 0.6, 0.7, 0.8, 0.9, 1, 1.2, 1.4, 1.5, 1.6, 1.8, 2, 2.2, 2.42.6, 2.8, 3, 3.5, 4, 4.5, 5, 5.5, 6, 6.5, 77.5, 8, 8.5, 9, 9.5, 10, 10.2, 10.4, 10.6, 10.8, and 11 wt. %. For example, according to certain preferred embodiments, the non-woven web can include an amount of a material selected from polyvinyl pyrrolidine, polymethyl methacrylate, polyvinylidene fluoride, polypropylene, polyethylene oxide, agarose, polyvinylidene fluoride, polylactic glycolic acid, nylon 6, polycaprolactone, polylactic acid, polybutylene terephthalate, and combinations thereof of less than 10 wt. %.

According to various embodiments, the process can exclude any detectable amount of a material selected form polyvinyl pyrrolidine, polymethyl methacrylate, polyvinylidene fluoride, polypropylene, polycarbonate, polyethylene oxide, agarose, polyvinylidene fluoride, polylactic glycolic acid, nylon 6, polycaprolactone, polylactic acid, polybutylene terephthalate, and combinations thereof.

Various embodiments relate to a product produced by the process. The product can be non-woven paper, medical implants, ultra-fine filters, membranes, hospital gowns, electrical insulation paper, honeycomb structures and personal hygiene products, dialyzers, blood, oxygenator filters, intravenous (IV) filters, diagnostic test filters, and blood/apheresis filters. The product can be a composite non-woven product comprising the spun filaments and at least one other fiber. The product can be a composite non-woven product adhered to a rolled sheet good. The product can be a composite non-woven product adhered to at least one of a sheet or film.

Various embodiments relate to a process for forming staple fibers from a polyetherimide component selected from (i) polyetherimide homopolymers, (ii) polyetherimide copolymers, and (iii) combinations thereof. The process can include: depositing a solution of the polyetherimide component in a solvent in a dispersion medium and shearing the dispersion medium such that the solution is formed into a polyetherimide fiber having a length to diameter ratio that is more than 1,000,000:1, 10,000:1, 500:1, or 100:1, and a diameter ranging from 50 nanometers to 5 micrometers or to 2 micrometers, which is insoluble in the dispersion medium; and collecting a plurality of polyetherimide fibers so formed. The process can further include the step of forming the collected fibers into a non-woven web.

Figure 2:
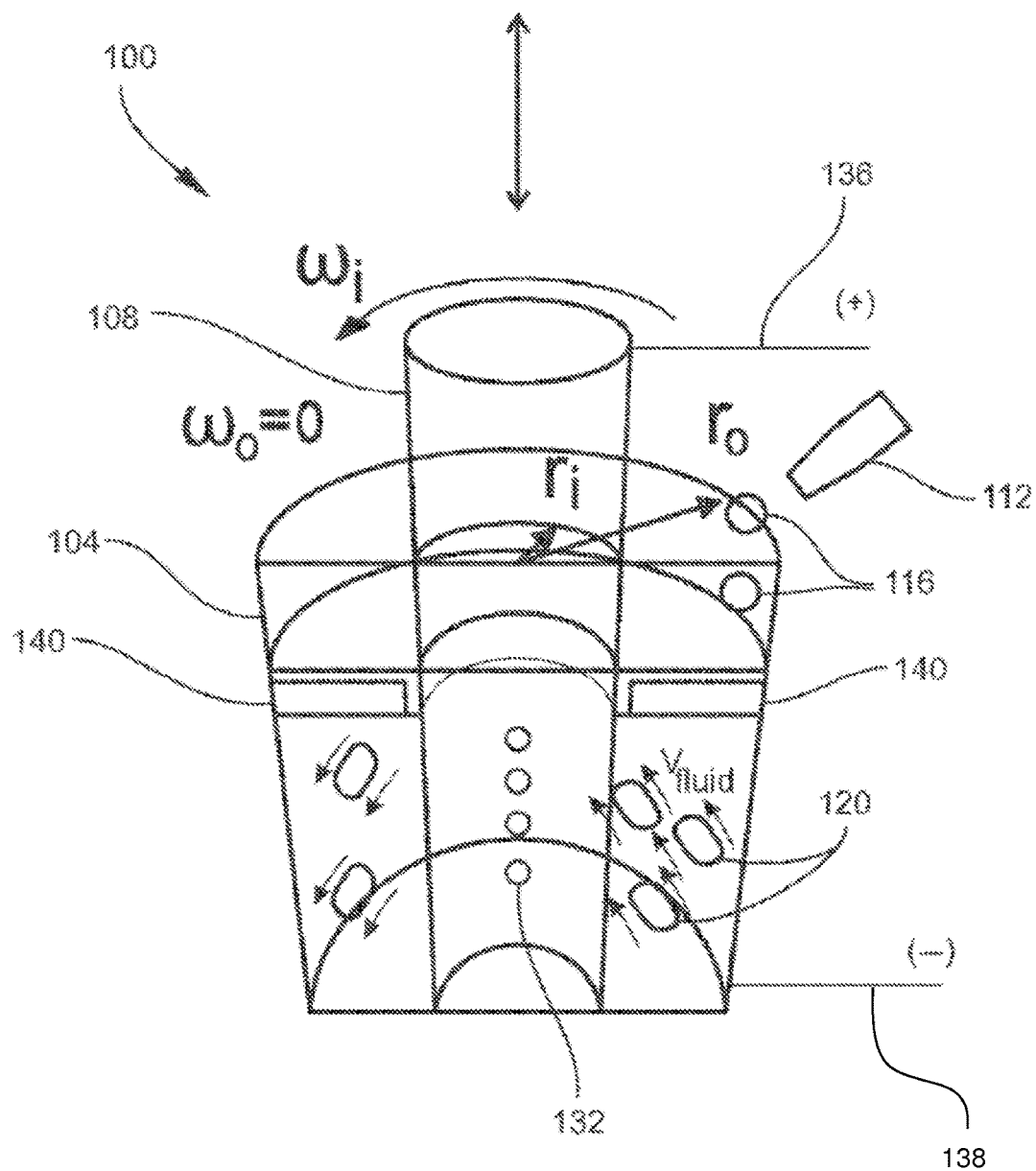
FIG. 2: is a cross-sectional view of an example of an apparatus or system that may be utilized for fabricating nanofibers in accordance with certain implementations of the present disclosure.

FIG. 2 is a schematic view of an example of an apparatus or system 100, as described in US 2013/0012598 by Velev et al., which is hereby incorporated by reference in its entirety. The apparatus or system 100 may be utilized for fabricating the nanofibers. The apparatus 100 generally includes a container 104 for containing a volume of dispersion medium and receiving polymer solution, a structure 108 extending out from the container 104, and a dispensing device 112 for supplying the polymer solution to the dispersion medium. The dispensing device 112 may be of any suitable type for introducing the polymer solution (optionally with additives) into the dispersion medium from a suitable supply source (not shown). The container 104 and the structure 108 may be configured such that they both provide surfaces cooperatively defining the boundaries of the volume of the dispersion medium, and such that the container 104 and/or the structure 108 move. That is, the container 104 serves as an outer boundary or surface and the structure 108 serves as an inner boundary or surface, at least one of which moves relative to the other to effect shearing. In the present example, the container 104 is a stationary outer cylinder and the structure 108 is an inner cylinder extending upward from the inside bottom of the outer cylinder in a concentric arrangement along its center axis. The outer cylinder and the inner cylinder cooperatively define an annular cylindrical interior containing the dispersion medium. The inner cylinder is driven by a suitable motor (not shown) to rotate at a desired angular velocity about the center axis, as indicated by an arrow. The polymer solution supplying device 112 may be any suitable conduit or applicator that dispenses the polymer solution from its tip by any operating principle (e.g., pumping action, capillary action, etc.). Rotation of the inner cylinder relative to the stationary outer cylinder imparts a shear stress to the components contained in the outer cylinder. By way of example, FIG. 2 illustrates polymer solution being dispensed into the outer cylinder 104 as droplets 116 and dispersed-phase components 120 of the polymer solution undergoing shear in the dispersion medium, which as described below causes polymer solvent to diffuse out from the dispersed-phase components 120 into the dispersion medium.

The apparatus 100 illustrated in FIG. 2 is advantageous in that it can generate uniform shear stress. Moreover, the shear stress may be highly tunable by changing one or more variables that control the shear stress proportionately, such as the viscosity of the dispersion medium (i.e., the shear medium), the shear rate (e.g., the revolution speed of the inner cylinder in the present example), and the gap between the outer cylinder and the inner cylinder. By controlling the shear stress, while keeping the shear stress uniform, one may control the final diameter of the uniform fibers produced by the apparatus 100. It will be understood that the present teachings are not limited, however, to the apparatus 100 illustrated by example in FIG. 2. Many other designs and types of apparatus may be suitable, but preferably are configured to enable the maintaining of uniform shear stress and control over the uniform shear stress as just described.

In the example illustrated in FIG. 2, the outer cylinder (container 104) has a radius of $r_0$ relative to its central axis, and the inner cylinder (structure 108) has a radius of r relative to the same axis. The inner cylinder rotates at an angular velocity of $\omega_i$, and the outer cylinder is stationary ($\omega_0=0$). The dispersion medium is or approximates a Newtonian fluid such that its fluid velocity profile may be depicted as shown during rotation of the inner cylinder.

As an alternative, the apparatus 100 may be configured to rotate the outer cylinder 104 at an angular velocity of $\omega_0$ while the inner cylinder 108 remains stationary ($\omega_i=0$). In this case, the dispersion medium will have a different fluid velocity profile (not shown) in which the velocity vectors are largest near the rotating outer cylinder 104 and smallest near the stationary inner cylinder 108. Rotation of the outer cylinder 104 may be useful for operating at higher shear stress without the onset of turbulence. As indicated by an arrow in FIG. 2, in some implementations the apparatus 100 may be configured to reciprocate or oscillate the inner cylinder 108 along its axis, i.e., in an axial direction orthogonal to the radial gap between the outer cylinder 104 and the inner cylinder 108, which may further contribute to stabilizing the flow. In other implementations, the polymer solution may be delivered to the dispersion medium through openings 132 formed through the inner cylinder 108 or other types of orifices, tubes or injectors.

In still other implementations, an electrical field may be applied in a radial direction by applying a voltage potential between the outer cylinder 104 and the inner cylinder 108, as depicted schematically by a positive terminal 136 and a negative terminal 138. Alternatively, the apparatus 100 may be configured to apply an electrical field in an axial direction. Depending on the kinetics of the fiber formation, it is possible to permanently polarize electrostatically fibers containing polar side-group chains. Hence, fibers exhibiting anisotropic surface properties may be formed. It is also possible to displace the nanoparticles inside the polymer creating fibers with anisotropic bulk structure. Other types of fields that can be applied during the shear formation process to modify the properties of the nanofibers formed include magnetic fields, light fields, or thermal gradients.

In some implementations, one or more baffles may be positioned perpendicular to the cylinders 104, 108 shown in FIG. 2, with each baffle having a central opening just large enough for the inner cylinder 104 to pass through. As an example, FIG. 2 illustrates an annular baffle 140. When such a device is filled with a liquid to a level just above the baffle 140, the air is not pulled in and the flow is more stable. One could also make use of additional strategies that have been reported for stabilizing flow. Most involve modulating the speed of the rotor, introducing liquid flow in the axial direction, or periodic movement of the central cylinder in the axial direction.

The invention is further described in the following illustrative examples in which all parts and percentages are by weight unless otherwise indicated.

EXAMPLES

Examples 1-5

Several variations of PEI resins were solution spun to average fiber diameters in the sub-micrometer range. FIG. 1 is an exemplary image of the fibers obtained. Table 1 provides a list of materials employed in Examples 1-5.

TABLE 1

| Component | Chemical Description | Source |
|---|---|---|
| PEI | polyetherimide | ULTEM(TM), SABIC |
| Glycerol | Glycerol (99.7%) | Brenntag Southwest, Inc. |
| Ethanol | Ethanol (Anhydrous ACS/USP grade, 99.5%) | Pharmaco-Aaper |
| Chloroform | Chloroform (99+%, extra pure, stabilized with ethanol) | Acros Organics |

Distributions of fiber diameters were measured by imaging the sample using a scanning electron microscope (SEM) (e.g., Phenom Pro Desktop SEM). A minimum magnification of 140× was used. A minimum of 4 images are retained for fiber diameter analysis. Fiber diameter analysis software (e.g., Fibermetric software) is used to measure the sample's images and at least 50 measurements per image, which are randomly selected by the software, are used in determining the average fiber diameter and distribution.

Example 1

Figure 3A:
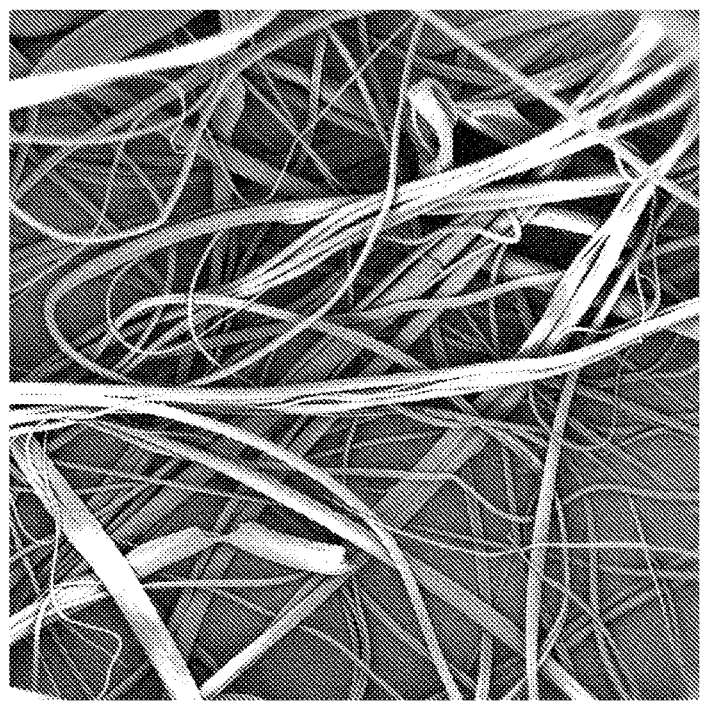
FIG. 3A: is an SEM micrograph, magnification of 1000×, showing the fiber morphology of the sample according to Example 1.
Figure 3B:
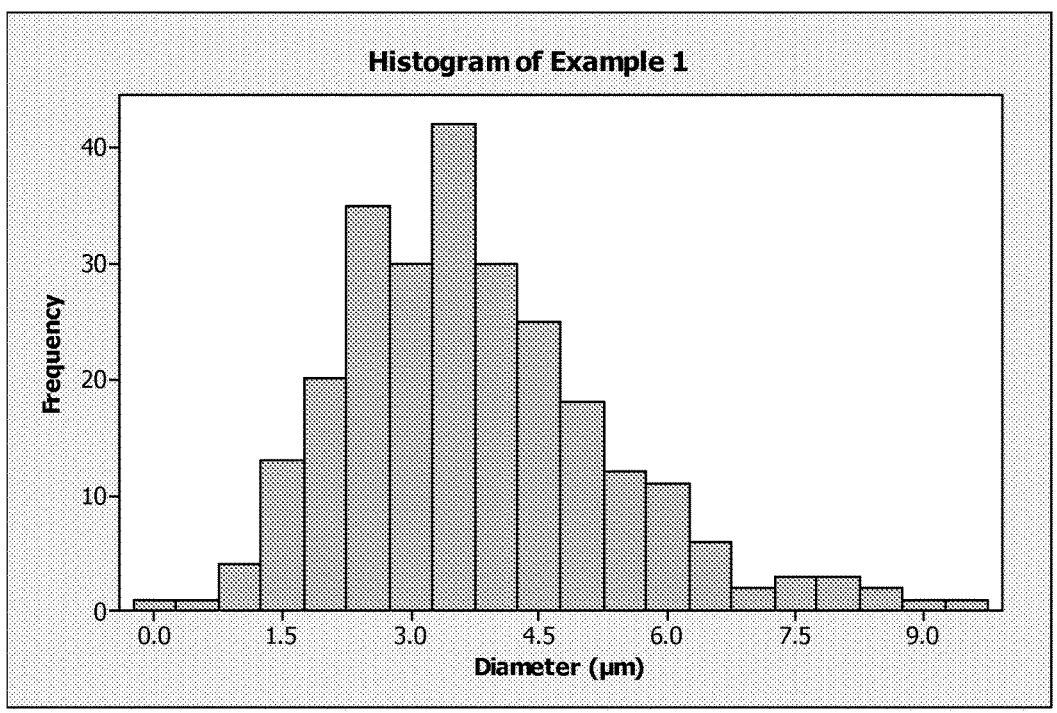
FIG. 3B: is a histogram of the fiber diameter measurements taken for the sample according to Example 1.

A solution (first dispersion medium) comprising of 15% ULTEM™ 1010 polyetherimide dissolved in chloroform, with a solution viscosity of about 500 cP, was injected into an anti-solvent (second dispersion medium) comprised of about 60% glycerol, about 25% ethanol and about 15% water flowing at a rate of 5 ml/min. This sample was produced using a Xanofi Xanoshear™ spinning system. The example resulted in fibers with a diameter between 165 nm and 9.5 pm with an average diameter of 3.7 μm. FIG. 3A represents the fiber morphology of the sample. FIG. 3B is a histogram of the fiber diameter measurements taken.

Example 2

Figure 4A:
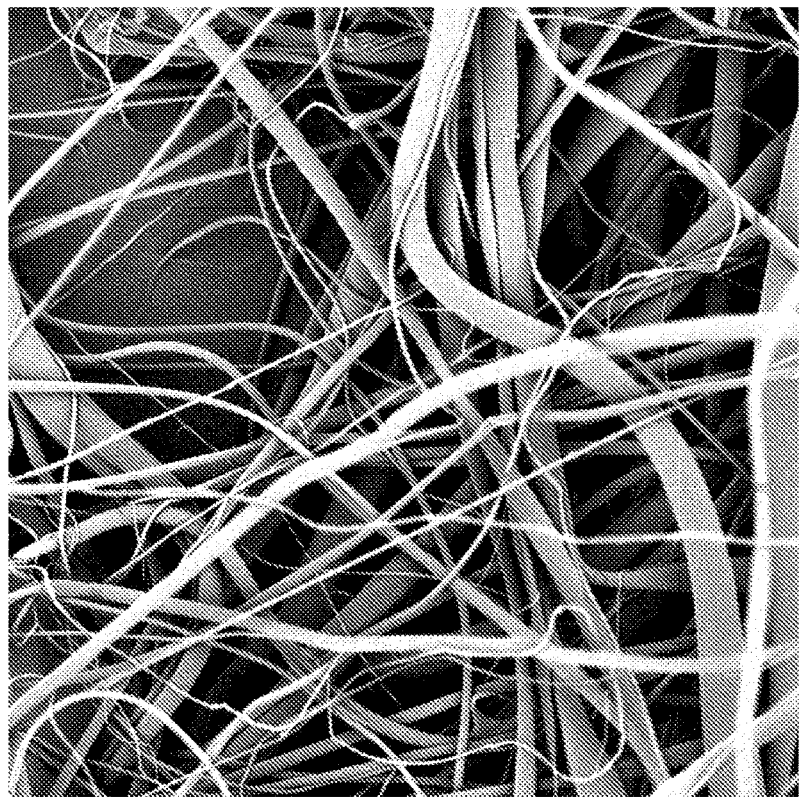
FIG. 4A: is an SEM micrograph, magnification of 2000×, showing the fiber morphology of the sample according to Example 2.
Figure 4B:
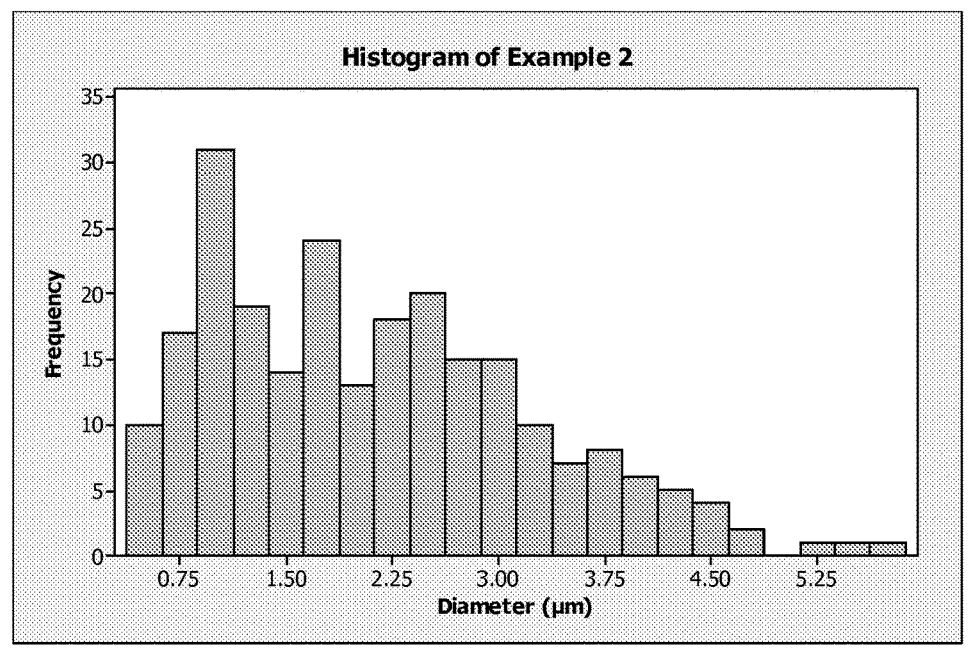
FIG. 4B: is a histogram of the fiber diameter measurements taken for the sample according to Example 2.

A solution (first dispersion medium) comprising of 15% ULTEM™1010 polyetherimide dissolved in chloroform, with a solution viscosity of about 500 cP, was injected into an anti-solvent (second dispersion medium) comprised of about 70% glycerol, about 17.5% ethanol and about 12.5% water flowing at a rate of 15 ml/min. This sample was produced using a Xanofi Xanoshear™ spinning system. The example resulted in fibers with a diameter between 400 nm and 5.8 μm with an average diameter of 2.1 μm. FIG. 4A represents the fiber morphology of the sample. FIG. 4B is a histogram of the fiber diameter measurements taken.

Example 3

Figure 5A:
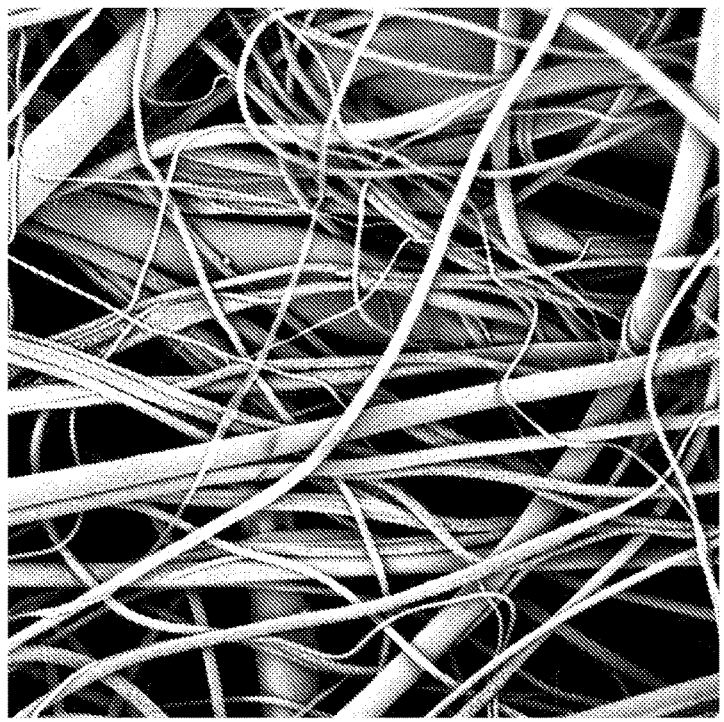
FIG. 5A: is an SEM micrograph, magnification of 3000× showing the fiber morphology of the sample according to Example 3.
Figure 5B:
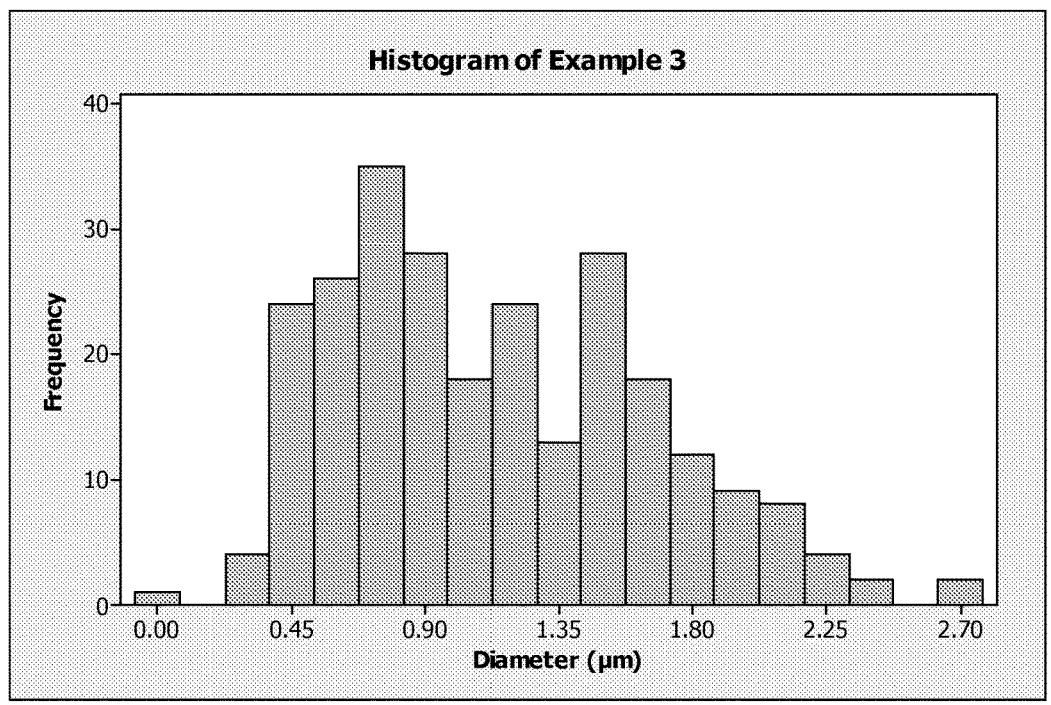
FIG. 5B: is a histogram of the fiber diameter measurements taken for the sample according to Example 3.

A solution (first dispersion medium) comprising of 20% ULTEM™1010 polyetherimide dissolved in chloroform, with a solution viscosity of about 2,000 cP, was injected into an anti-solvent (second dispersion medium) comprised of about 70% glycerol, about 17.5% ethanol and about 12.5% water flowing at a rate of 10 ml/min. This sample was produced using a Xanofi Xanoshear™ spinning system. The example resulted in fibers with a diameter between 50 nm and 2.7 μm with an average diameter of 1.1 μm. FIG. 5A represents the fiber morphology of the sample. FIG. 5B is a histogram of the fiber diameter measurements taken.

Example 4

Figure 6A:
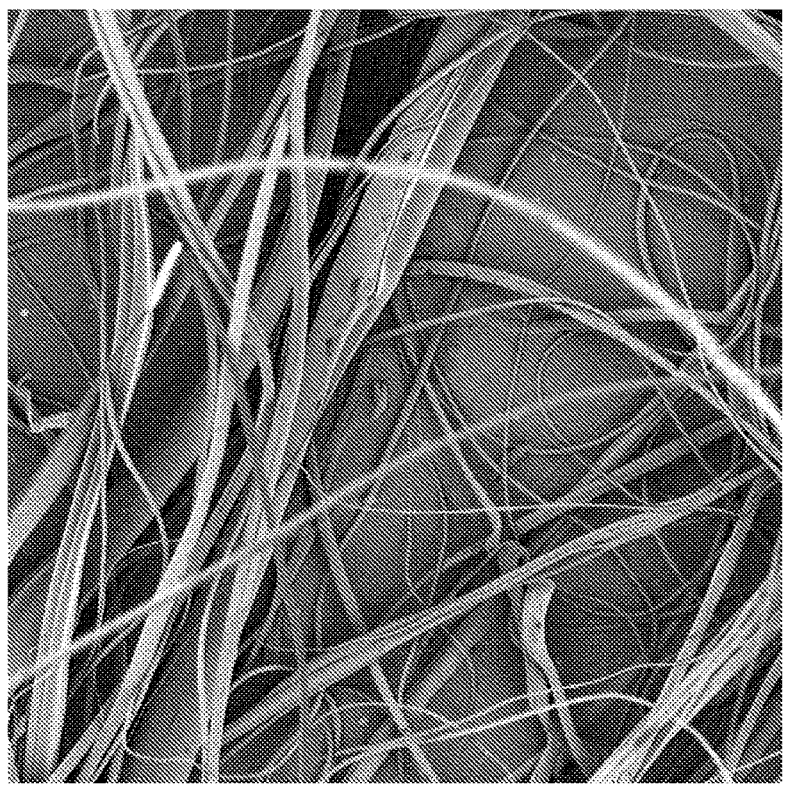
FIG. 6A: is an SEM micrograph, magnification of 500× showing the fiber morphology of the sample according to Example 4.
Figure 6B:
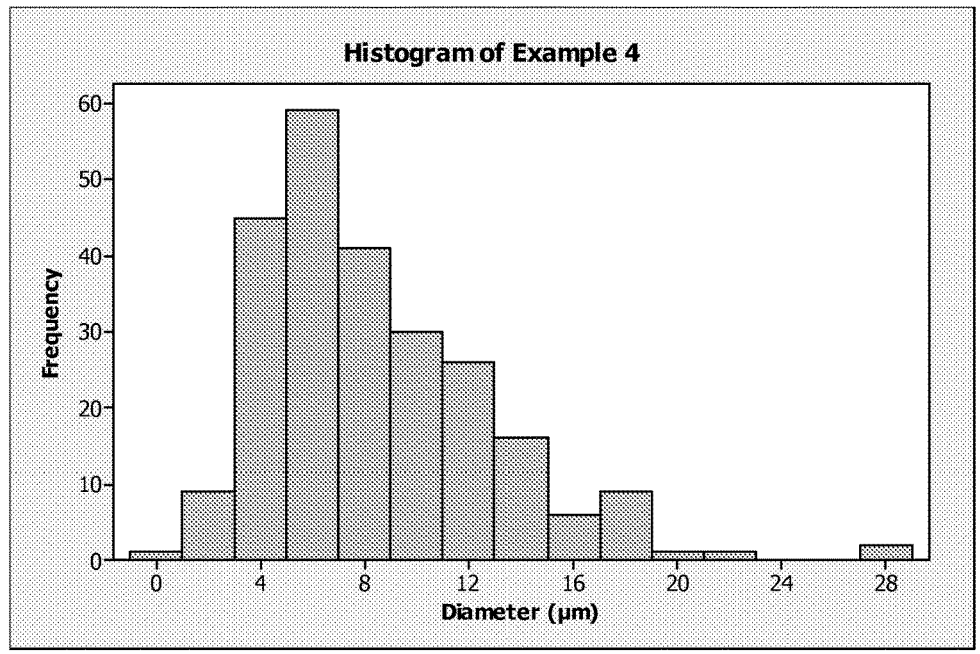
FIG. 6B: is a histogram of the fiber diameter measurements taken for the sample according to Example 4.

As a comparative example, a solution (first dispersion medium) comprising of 25% ULTEM™ 1010 polyetherimide dissolved in chloroform, with a solution viscosity of about 6,000 cP, was injected into an anti-solvent (second dispersion medium) comprised of about 60% glycerol, about 25% ethanol and about 15% water flowing at a rate of 10 ml/min. This sample was produced using a Xanofi Xanoshear™ spinning system. The example resulted in fibers with a diameter between 520 nm and 28.1 μm with an average diameter of 8.4 μm. FIG. 6A represents the fiber morphology of the sample. FIG. 6B is a histogram of the fiber diameter measurements taken.

Example 5

Figure 7A:
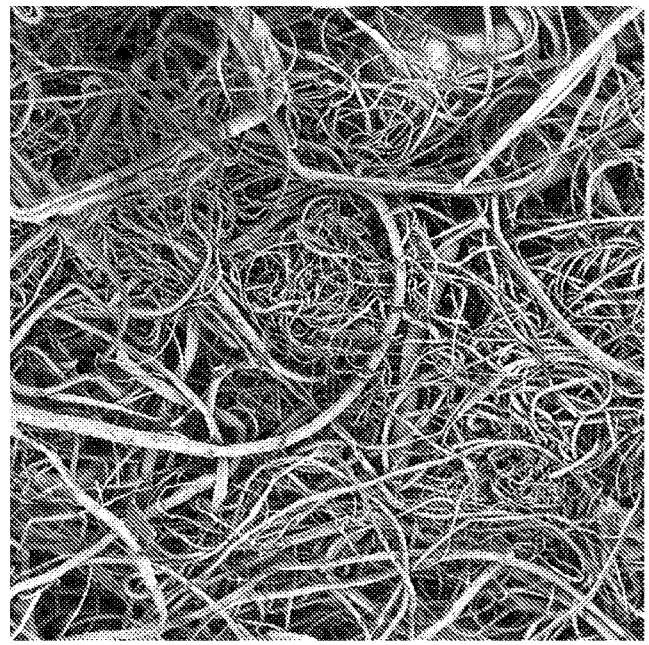
FIG. 7A: is an SEM micrograph, magnification of 900×, showing the fiber morphology of the sample according to Example 5.
Figure 7B:
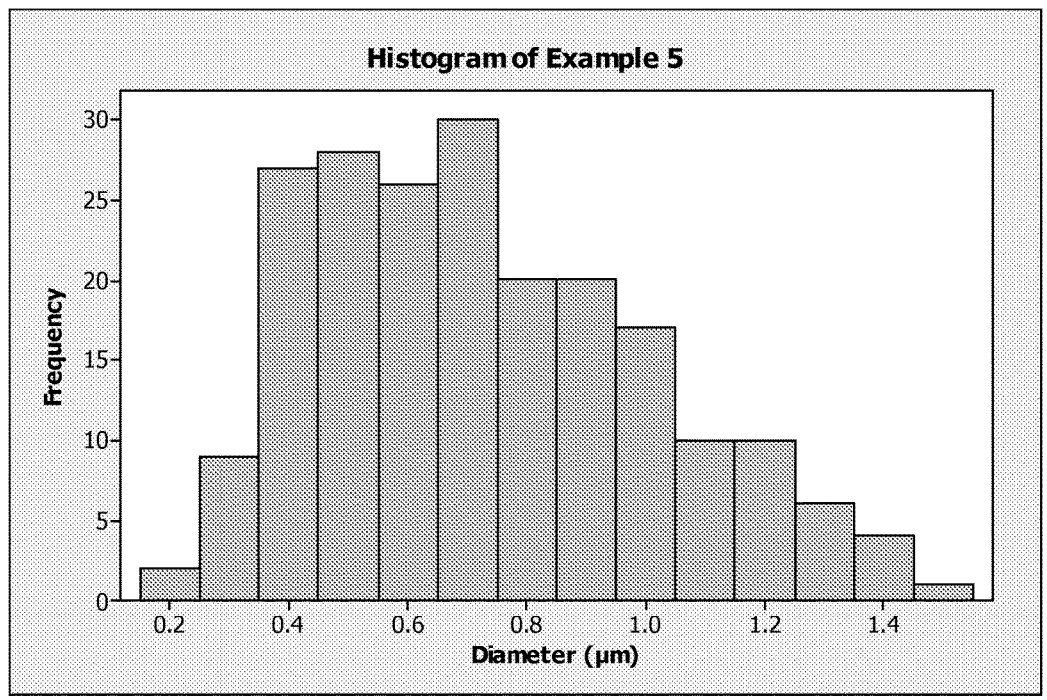
FIG. 7B: is a histogram of the fiber diameter measurements taken for the sample according to Example 5.
Figure 8:
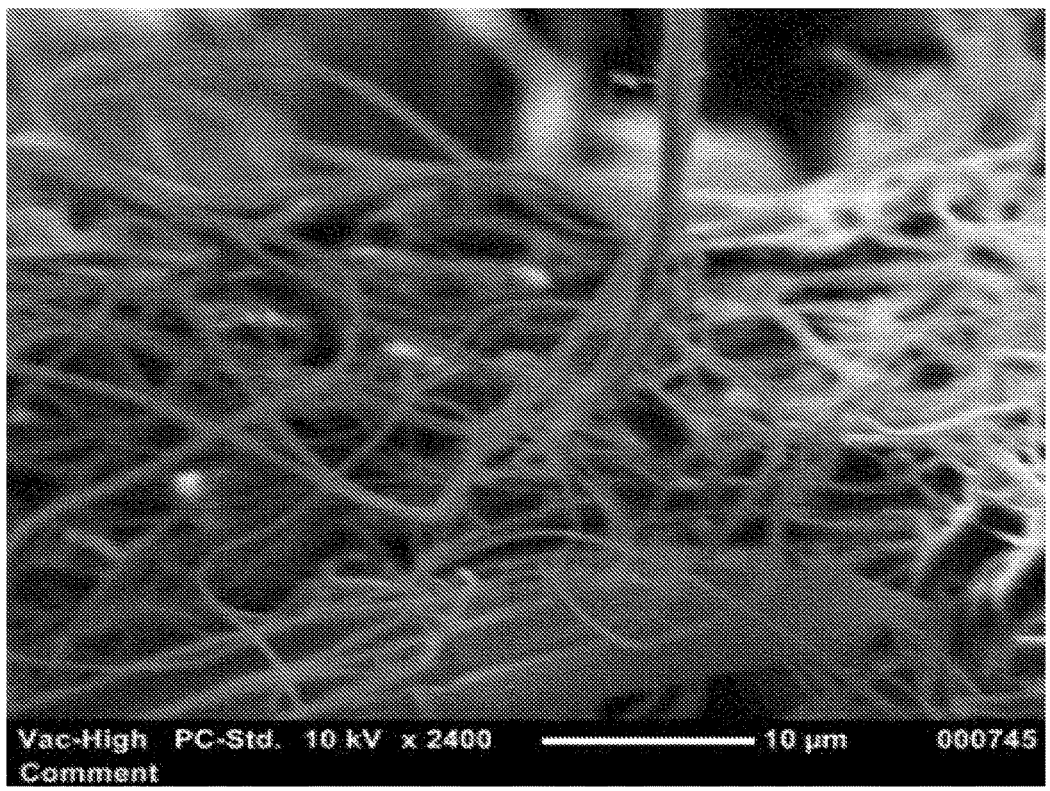
FIG. 8: shows an example of the results of solution shear spinning PPO6130 ™ into sub-micrometer fibers.

As a comparative example, a solution (first dispersion medium) comprising of 20% ULTEM™ 1010 polyetherimide dissolved in chloroform, with a solution viscosity of about 6,000 cP, could be injected into an anti-solvent (second dispersion medium) comprised of about 65% glycerol, about 20% ethanol and about 15% water flowing at a rate of 15 ml/min. This sample was produced using a Xanofi Xanoshear™ spinning system. The example resulted in fibers with a diameter between 220 nm and 1.4 μm with an average diameter of 730 nm. FIG. 7A represents the fiber morphology of the sample. FIG. 7B is a histogram of the fiber diameter measurements taken.

Examples 6-9

Several variations of polyphenylene ether (PPE) resin were solution spun to average fiber diameters in the sub-micrometer range. Table 2 provides a list of materials employed in Examples 6-9.

TABLE 2

| Component | Chemical Description | Source |
|---|---|---|
| PPE/PPO | Polyphenylene ether/Polyphenylene oxide | SABIC |
| Glycerol | Glycerol (99.7%) | Brenntag Southwest, Inc. |
| Ethanol | Ethanol (Anhydrous ACS/USP grade, 99.5%) | Pharmaco-Aaper |
| Chloroform | Chloroform (99+%, extra pure, stabilized with ethanol) | Acros Organics |

Distributions of fiber diameters were measured by imaging the sample using a scanning electron microscope (SEM) (e.g., Phenom Pro Desktop SEM). A minimum magnification of 140× was used. A minimum of 4 images are retained for fiber diameter analysis. Fiber diameter analysis software (e.g., Fibermetric software) is used to measure the sample's images and at least 50 measurements per image, which are randomly selected by the software, are used in determining the average fiber diameter and distribution.

Example 6

Figure 9A:
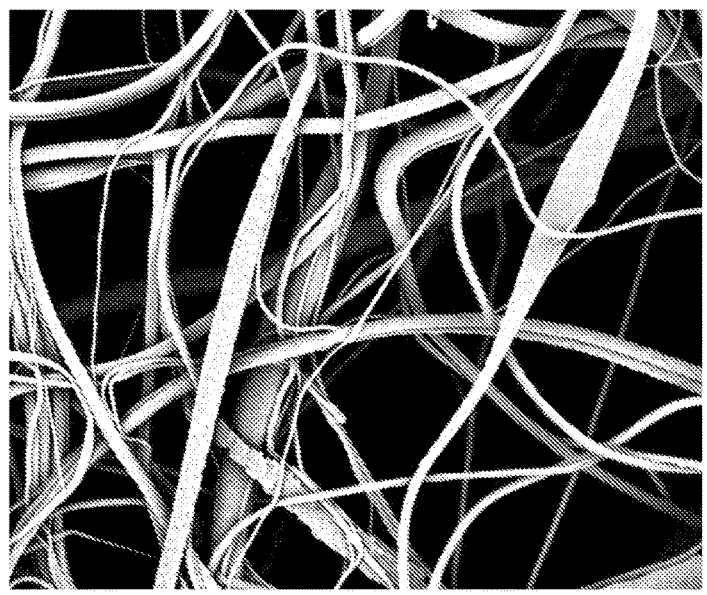
FIG. 9A: is an SEM micrograph, magnification of 4000×, showing the fiber morphology of the sample according to Example 6.
Figure 9B:
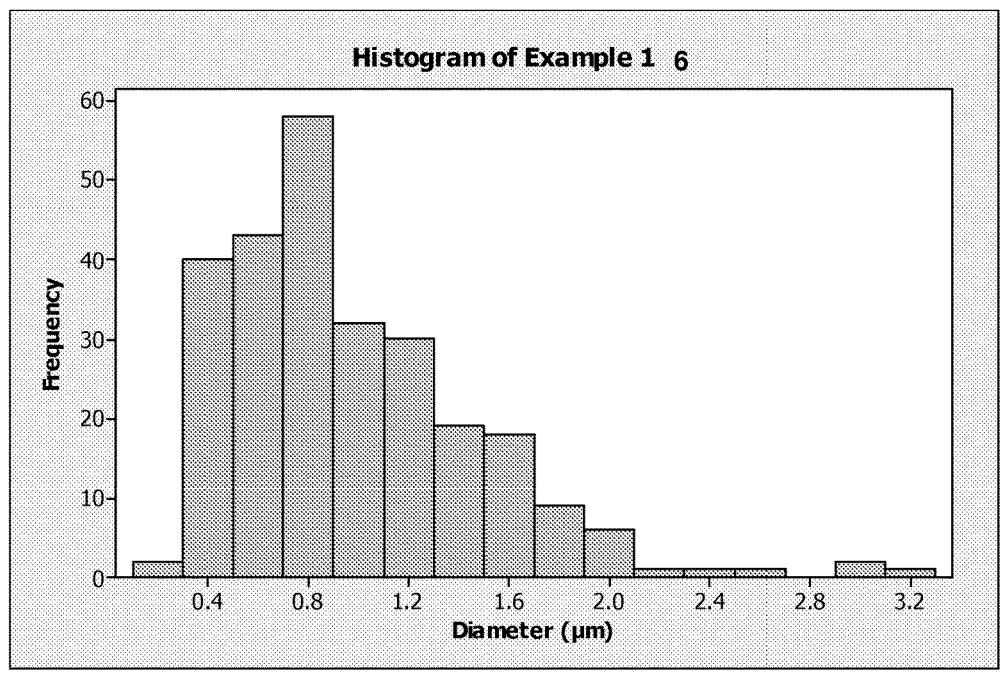
FIG. 9B: is a histogram of the fiber diameter measurements taken for the sample according to Example 6.

A solution (first dispersion medium) comprising of 8% PPO6130 polyphenylene oxide dissolved in chloroform, with a solution viscosity of about 900 cP, was injected into an anti-solvent (second dispersion medium) comprised of about 70% glycerol, about 17.5% ethanol and about 12.5% water flowing at a rate of 15 ml/min. This sample was produced using a Xanofi Xanoshear™ spinning system. The example resulted in fibers with a diameter between 270 nm and 3.1 µm with an average diameter of 970 nm. FIG. 9A represents the fiber morphology of the sample. FIG. 9B is a histogram of the fiber diameter measurements taken.

Example 7

Figure 10A:
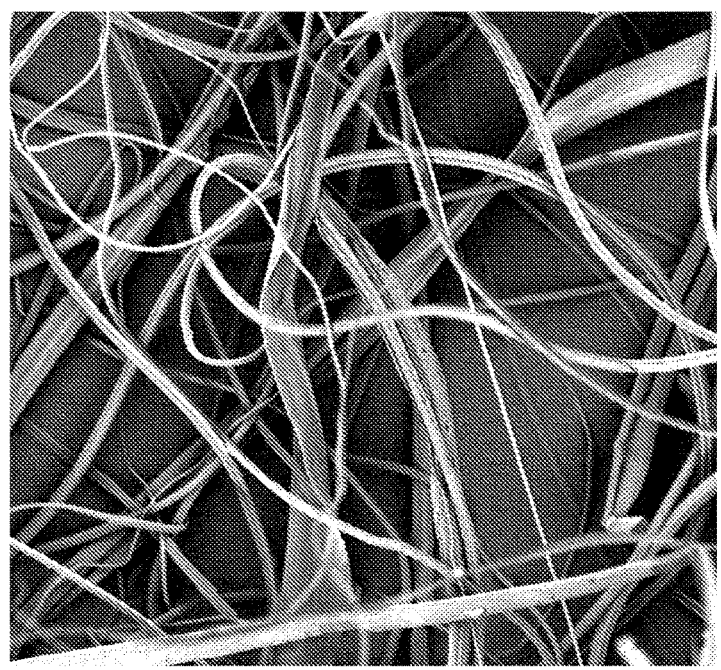
FIG. 10A: is an SEM micrograph, magnification of 4000×, showing the fiber morphology of the sample according to Example 7.
Figure 10B:
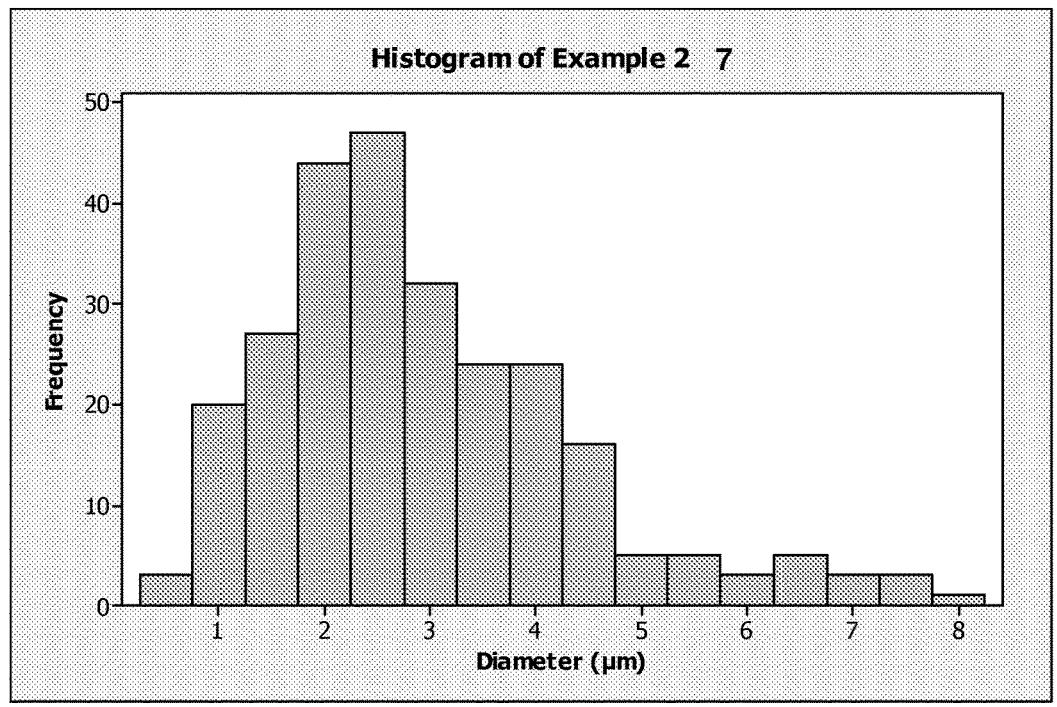
FIG. 10B: is a histogram of the fiber diameter measurements taken for the sample according to Example 7.

A solution (first dispersion medium) comprising of 8% PPO6130 polyphenylene oxide dissolved in chloroform, with a solution viscosity of about 900 cP, was injected into an anti-solvent (second dispersion medium) comprised of about 60% glycerol, about 25% ethanol and about 15% water flowing at a rate of 5 ml/min. This sample was produced using a Xanofi Xanoshear™ spinning system. The example resulted in fibers with a diameter between 615 nm and 8.0 µm with an average diameter of 2.9 µm. FIG. 10A represents the fiber morphology of the sample. FIG. 10B is a histogram of the fiber diameter measurements taken.

Example 8

Figure 11A:
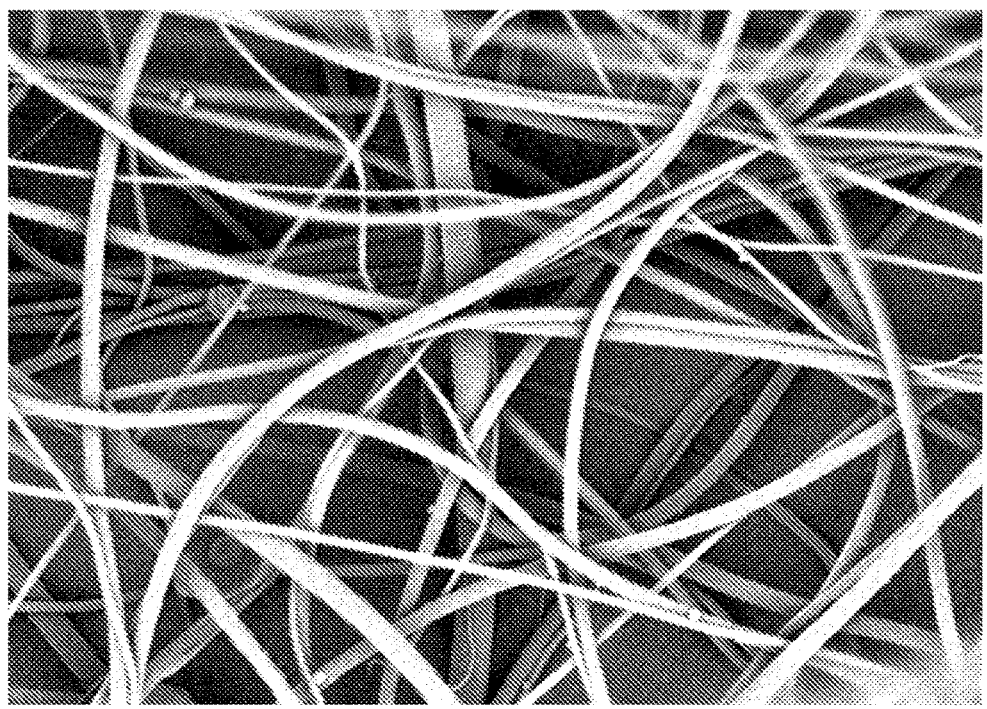
FIG. 11A: is an SEM micrograph, magnification of 3500× showing the fiber morphology of the sample according to Example 8.
Figure 11B:
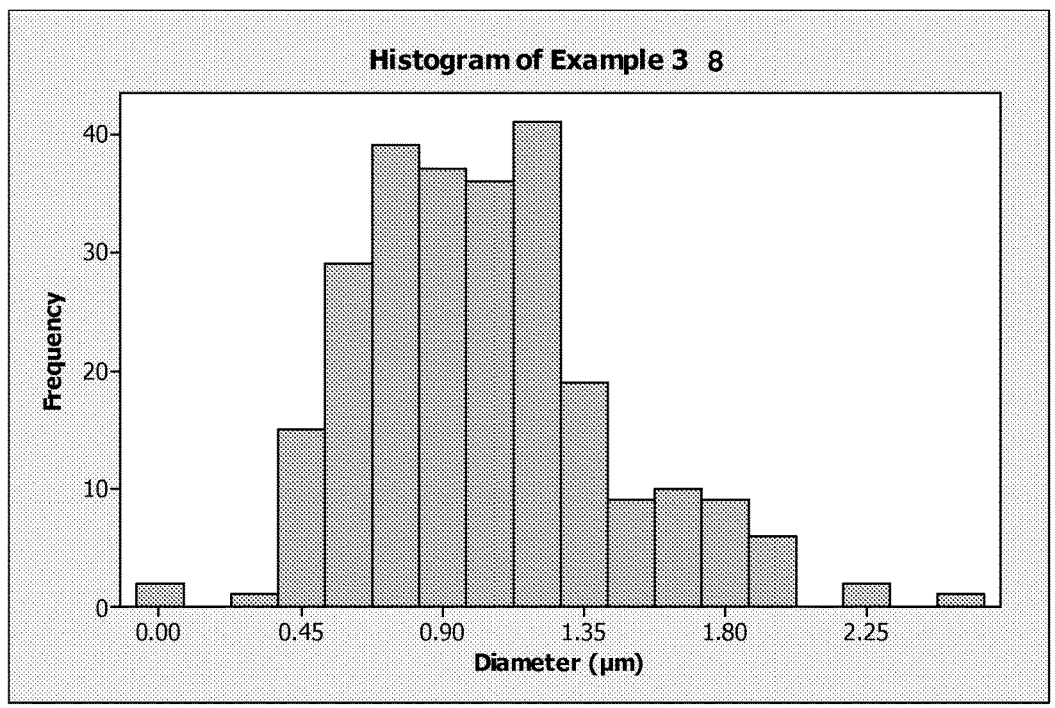
FIG. 11B: is a histogram of the fiber diameter measurements taken for the sample according to Example 8.

A solution (first dispersion medium) comprising of 11% PPO6130 polyphenylene oxide dissolved in chloroform, with a solution viscosity of about 5,000 cP, was injected into an anti-solvent (second dispersion medium) comprised of about 70% glycerol, about 17.5% ethanol and about 12.5% water flowing at a rate of 10 ml/min. This sample was produced using a Xanofi Xanoshear™ spinning system. The example resulted in fibers with a diameter between 50 nm and 2.5 µm with an average diameter of 1.0 µm. FIG. 11A represents the fiber morphology of the sample. FIG. 11B is a histogram of the fiber diameter measurements taken.

Example 9

Figure 12A:
FIG. 12A: is an SEM micrograph, magnification of 1200×, showing the fiber morphology of the sample according to Example 9.
Figure 12B:
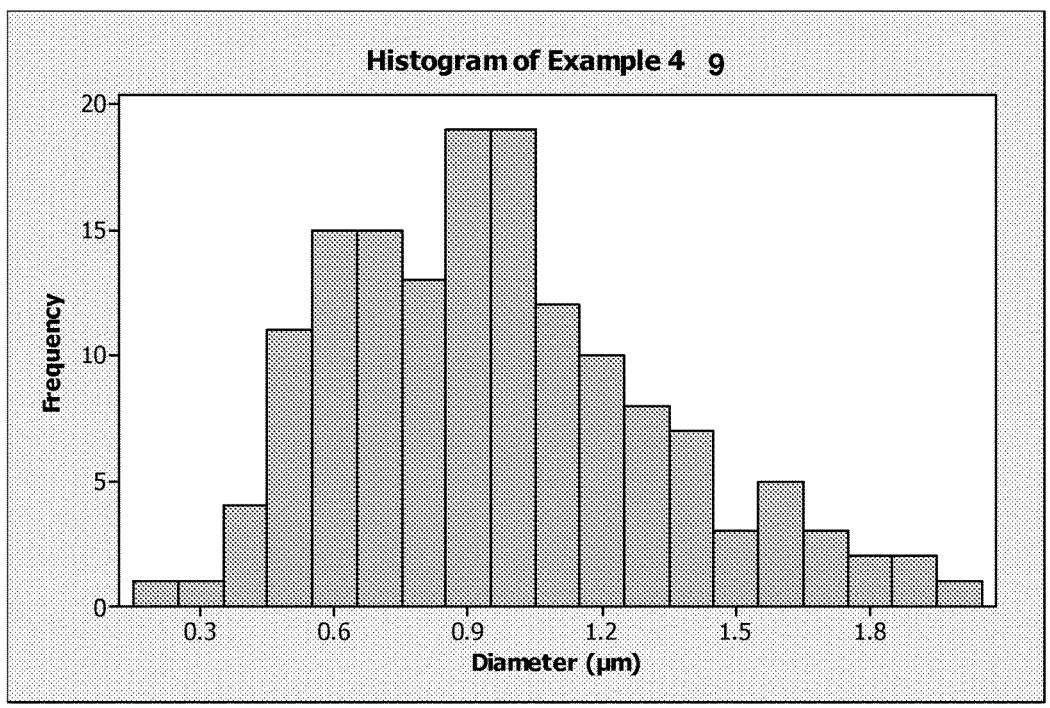
FIG. 12B: is a histogram of the fiber diameter measurements taken for the sample according to Example 9.

A solution (first dispersion medium) comprising of 12% PPO6130 polyphenylene oxide dissolved in chloroform, with a solution viscosity of about 7,000 cP, was injected into an anti-solvent (second dispersion medium) comprised of about 65% glycerol, about 20% ethanol and about 15%. This sample was produced using a Xanofi Xanoshear™ spinning system. The example resulted in fibers with a diameter between 225 nm and 2.0 µm with an average diameter of 960 nm. FIG. 12A represents the fiber morphology of the sample. FIG. 12B is a histogram of the fiber diameter measurements taken.

Example 10

Polycarbonate was solution spun to average fiber diameters in the sub-micrometer range. Table 3 provides a list of materials employed in Example 10.

TABLE 3

| Component | Chemical Description | Source |
|---|---|---|
| PC | polycarbonate | LEXAN ™, SABIC |
| THF | Tetrahydrofuran (75%) | Any commercially available source |
| DMF | dimethylformamide (25%) | Any commercially available source |

Figure 13A:
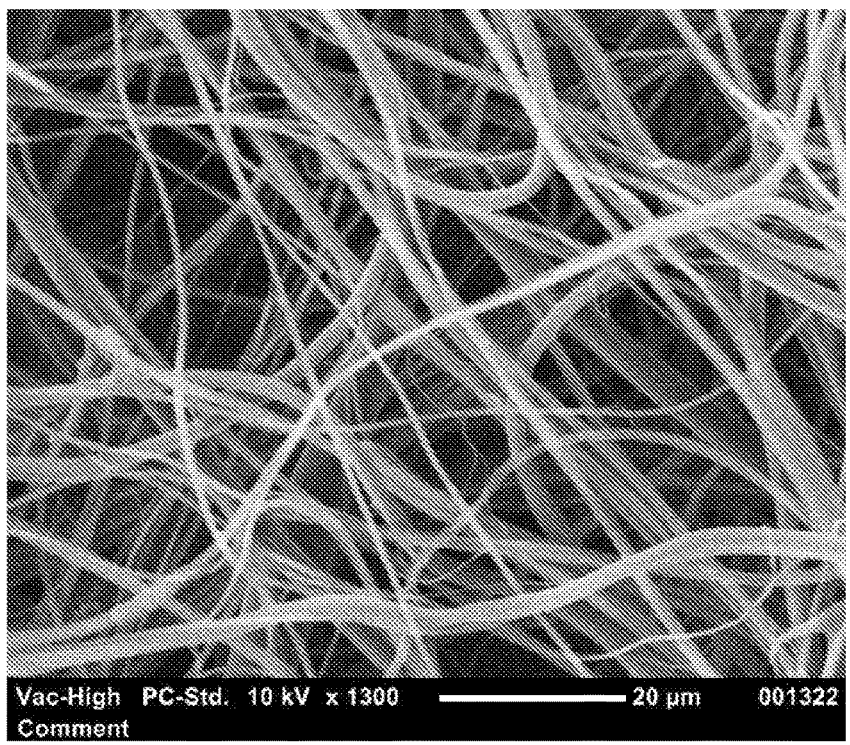
FIG. 13A: is an SEM micrograph, magnification of 1300×, showing the fiber morphology of the sample according to Example 10.
Figure 13B:
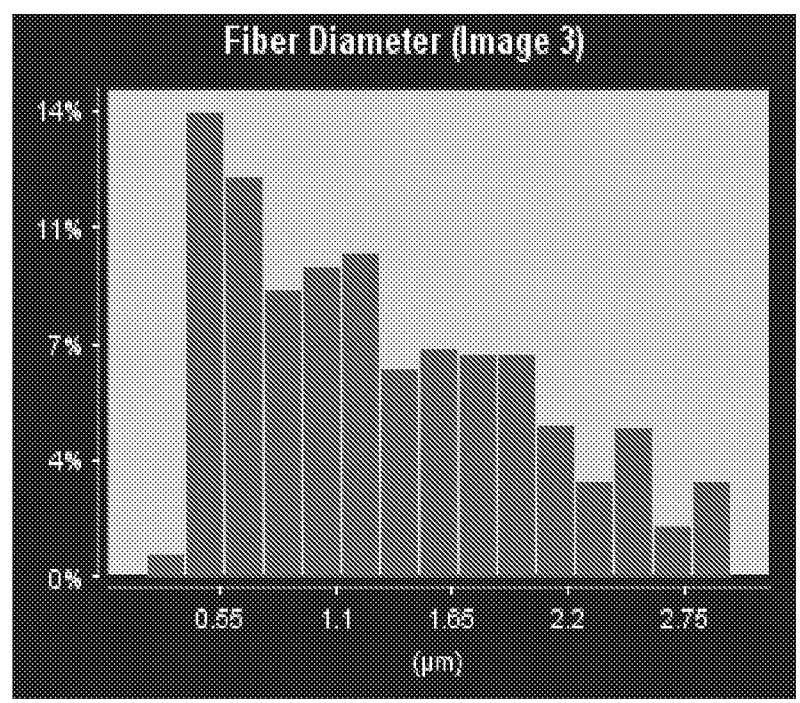
FIG. 13B: is a histogram of the fiber diameter measurements taken for the sample according to Example 10.

A solution (first dispersion medium) comprising of 20% LEXAN™ 101 polycarbonate resin dissolved in mixture of 75% THF and 25% DMF, was injected into an anti-solvent (second dispersion medium) comprised of about 75% ethanol and about 25% water flowing at a rate of 60 ml/min. This sample was produced using a Xanofi Xanoshear™ spinning system. The example resulted in fibers with a diameter between 38 nm and 2.96 µm with an average diameter of 1.32 µm. FIG. 13A represents the fiber morphology of the sample. FIG. 13B is a histogram of the fiber diameter measurements taken.

What is claimed is:
1. A process comprising:
shearing a first dispersion medium and a second dispersion medium under conditions that precipitate a plurality of staple polymeric fibers,
wherein each of the plurality of staple polymeric fibers has a length to diameter ratio of greater than 100:1,
wherein each of the plurality of staple polymeric fibers has a diameter ranging from 0.05 to 5 micrometers,
wherein each of the plurality of staple polymeric fibers is insoluble in the second dispersion medium,
wherein the first dispersion medium is a solution comprising at least one of (a) polyetherimide homopolymers and polyetherimide co-polymers;
wherein the second dispersion medium comprises water, ethyl alcohol, propyl glycol, propylene glycol, glycerol, or combinations thereof and further comprises meta-cresol, veratrol, ortho-dichlorobenzene, N-methyl pyrrolidone, chloroform, tetrahydrofuran, dimethylformamide, dimethylacetamide, or combinations thereof, wherein the first dispersion medium is insoluble in the second dispersion medium; and collecting the plurality of polymeric staple fibers at a rate of at least 300 grams/hour.

2. The process of claim 1, wherein the first dispersion medium is injected into the second dispersion medium.

3. The process of claim 1, wherein the first dispersion medium further comprises meta-cresol, veratrol, ortho-dichlorobenzene, N-methyl pyrrolidone, chloroform, tetrahydrofuran, dimethylformamide, dimethylacetamide, or combinations thereof.

4. The process of claim 1, further comprising producing a non-woven web from the collected fibers by depositing the plurality of polymeric staple fibers onto a carrier substrate, a functional sheet, a film, a non-woven, a rolled good product, or combinations thereof.

5. The process of claim 4, further comprising at least partially removing the solvent from the fibers before the fibers are deposited.

6. The process of claim 4, wherein the non-woven web has a width of at least 150 mm.

7. The process of claim 1, further comprising producing a non-woven web from the collected fibers, wherein the non-woven web is formed by entangling the fibers.

8. The process of claim 7, further comprising consolidating the non-woven web under pressure.

9. The process of claims 1, wherein the process is carried out at −30 to 210° C.

10. The process of claims 1, wherein the first dispersion medium has a viscosity of from 10 to 20,000 cP, and the second dispersion medium has a viscosity of from 10 to 20,000 cP.

11. The process of claim 1, wherein each of the plurality of polymeric fibers is provided with at least one additional functionality imparting at least one of therapeutic activity, catalytic activity microelectronic activity, micro-optoelectronic activity, magnetic activity, biological activity, or combinations thereof.

12. The process of claim 4, wherein the non-woven web contains less than 10 wt % of polyvinyl pyrrolidine, polymethyl methacrylate, polyvinylidene fluoride, polypropylene, polycarbonate, polyethylene oxide, agarose, polyvinylidene fluoride, polylactic glycolic acid, nylon 6, polycaprolactone, polylactic acid, polybutylene terephthalate, or combinations thereof.

13. The process of claim 1, wherein the polyetherimide component is a reaction product of at least one from the group consisting of (i) 4,4'-bisphenol A dianhydride and diamine monomers; (ii) 4,4'-bisphenol A dianhydride and meta-phenylene diamine monomers and (iii) 4,4'-bisphenol A dianhydride and paraphenylene diamine monomers; wherein the reaction product is endcapped with at least one of (a) aniline and (b) phthalic anhydride.

14. The process of claim 1, wherein the polyetherimide component is a thermoplastic resin composition comprising:
the polyetherimide, and
a phosphorous-containing stabilizer, in an amount that is effective to increase the melt stability of the polyetherimide, wherein the phosphorous-containing stabilizer exhibits a low volatility such that, as measured by thermogravimetric analysis of an initial amount of a sample of the phosphorous-containing stabilizer, greater than or equal to 10 percent by weight of the initial amount of the sample remains unevaporated upon heating of the sample from room temperature to 300° C. at a heating rate of 20° C. per minute under an inert atmosphere.

* * * * *